(12) United States Patent
Mikuriya et al.

(10) Patent No.: US 7,592,582 B2
(45) Date of Patent: Sep. 22, 2009

(54) CONFOCAL SCANNER HAVING BEAM SPREAD ANGLE ADJUSTMENT DEVICE

(75) Inventors: Kenta Mikuriya, Musashino (JP); Takashi Yoshida, Musashino (JP); Yasuhito Kosugi, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 122 days.

(21) Appl. No.: 11/382,724

(22) Filed: May 11, 2006

(65) Prior Publication Data

US 2007/0096014 A1 May 3, 2007

(30) Foreign Application Priority Data

Oct. 27, 2005 (JP) ............................. 2005-312205

(51) Int. Cl.
*H01J 3/14* (2006.01)
*G02B 21/06* (2006.01)
(52) U.S. Cl. ...................... 250/216; 359/385
(58) Field of Classification Search .................. 250/216, 250/227.11; 359/368, 385
See application file for complete search history.

(56) References Cited

U.S. PATENT DOCUMENTS

2006/0245084 A1 * 11/2006 Brustle et al. ................ 359/744

FOREIGN PATENT DOCUMENTS

| JP | 5-60980 | 3/1993 |
| JP | 2001-228402 | 8/2001 |
| JP | 2004-212434 A * | 7/2004 |

* cited by examiner

*Primary Examiner*—Thanh X Luu
(74) *Attorney, Agent, or Firm*—Westerman, Hattori, Daniels & Adrian, LLP.

(57) ABSTRACT

There is achieved a confocal scanner capable of being adjusted can be achieved with ease so as to be in a well-balanced state where a utilization ratio of an excited light is high and light quantity distribution on the cross-section of beams is excellent in evenness even in the case of being coupled with an optical fiber varying in a beam spread-angle. The confocal scanner is provided with a collimator lens for causing beams outgoing from an emission end of an optical fiber for guiding an excited light, with a predetermined spread-angle, to be converted into collimated beams before falling on a microlens disk, wherein a beam spread-angle adjusting means for adjusting the spread-angle is provided between the emission end, and the collimator lens.

4 Claims, 11 Drawing Sheets

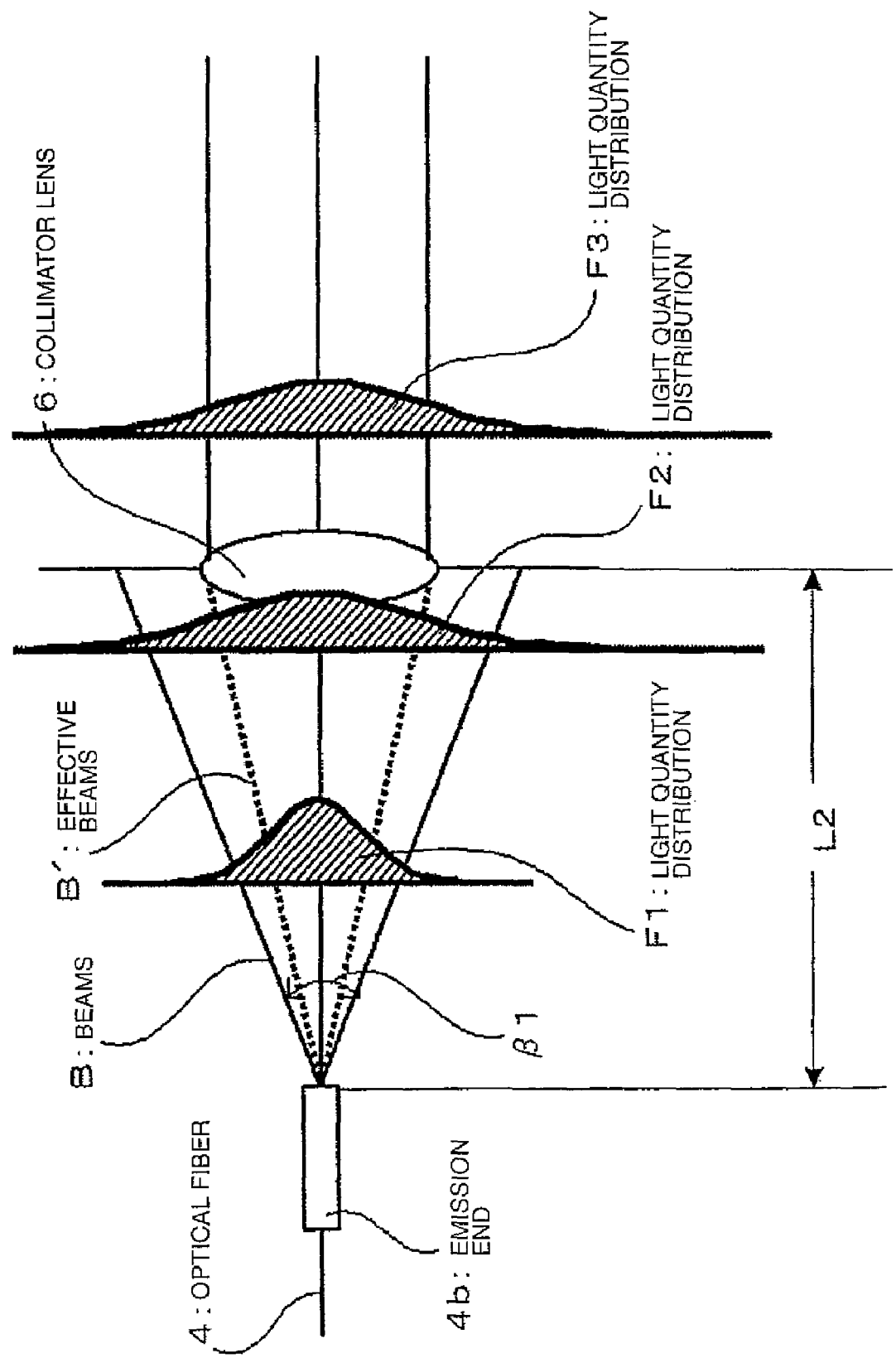

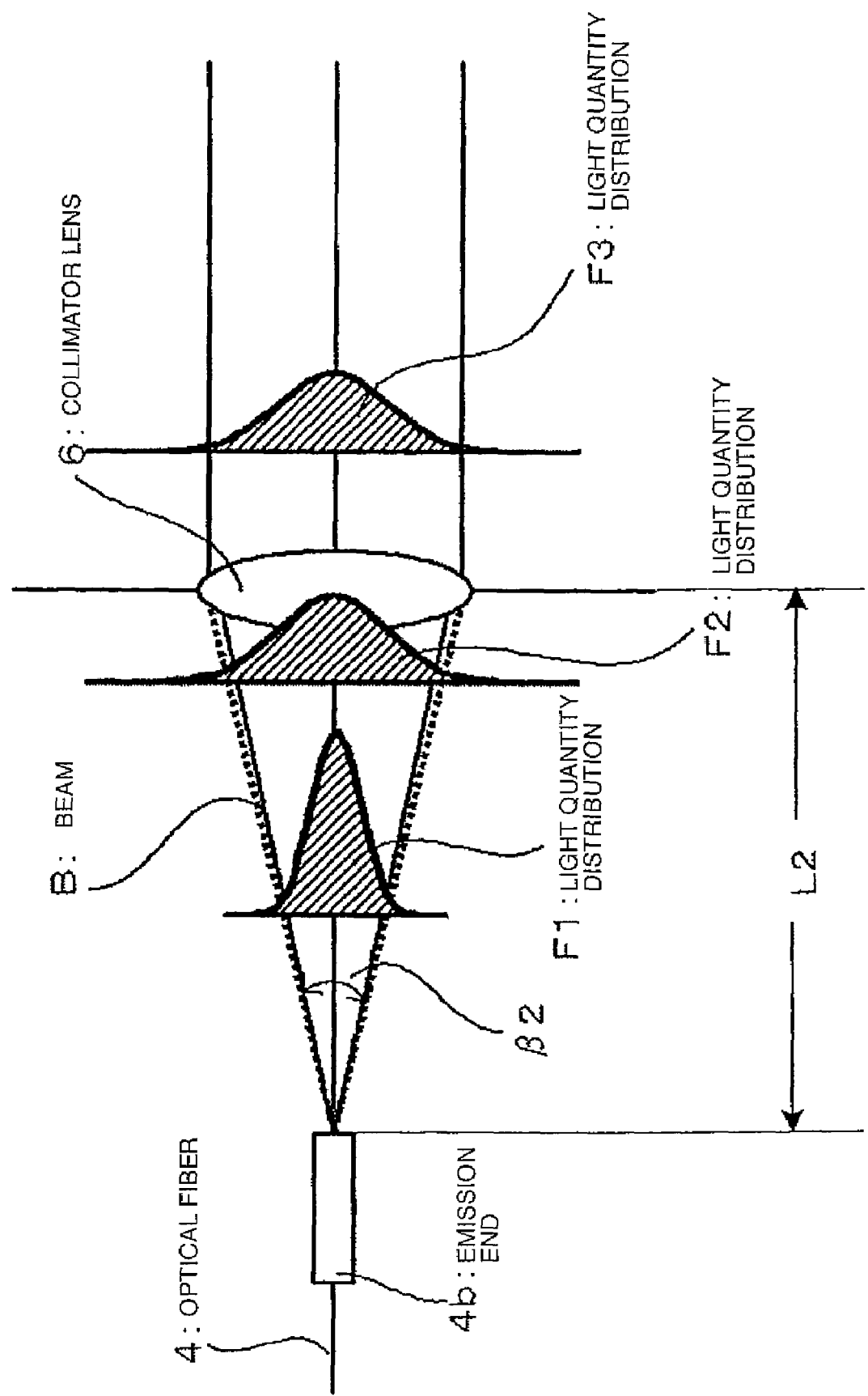

CONFOCAL SCANNER HAVING BEAM SPREAD ANGLE ADJUSTMENT DEVICE

FIELD OF THE INVENTION

The present invention relates to a confocal scanner provided with a collimator lens for converting beams outgoing from an emission end of an optical fiber for guiding an excited light, with a predetermined spread-angle, into collimated beams before falling on a microlens disk.

BACKGROUND OF THE INVENTION

FIG. 7 is a perspective view showing an example of a configuration of the principal parts of a confocal scanner employing the conventional Nipkow disk method. The related art concerning the confocal scanner employing the conventional Nipkow disk method has been disclosed in Patent Document 1.

An excited light 2 emitted from a light source 1 is guided into an incident end 4a of an optical fiber 4 by a condenser lens 3. The excited light 2 is guided by the optical fiber 4, up to an emission end 4b thereof, coupled to a light guide inlet of a confocal scanner unit 5.

Beams of the excited light 2 emitted from the emission end 4b of the optical fiber 4 are turned into diverging rays with a spread-angle dependent on NA of the optical fiber 4, thereby falling on a collimator lens 6. The collimator lens 6 is disposed at a position where a distance between the emission end 4b and the collimator lens 6 coincides with a focal length of the collimator lens 6, and beams incident thereon are converted into collimated beams before being emitted.

The collimated beams converted from the excited light 2 fall on a microlens disk 7 to be thereby converted into converging rays by respective microlenses disposed on the microlens disk 7. The respective excited lights 2 converted into the converging rays are transmitted through a dichroic mirror 8 to be subsequently condensed on a pinhole disk 9.

As pinholes are disposed on the pinhole disk 9, so as to be in the same pattern as a pattern in which the microlenses are disposed on the microlens disk 7, the respective excited lights 2 condensed on the pinhole disk 9 can be transmitted through the respective pinholes corresponding thereto.

The respective excited lights 2 transmitted through the pinhole disk 9, as described above, are condensed on an observation specimen 11 by an objective lens 10. A fluorescent light is generated on the observation specimen 11 by the excited light 2, and the fluorescent light serving as an observation light 12 is condensed again on the pinhole disk 9 by the objective lens 10. The observation light 12 transmitted through the pinhole on account of a confocal effect is reflected by the dichroic mirror 8 to be subsequently condensed on an image sensor 14 via a relay lens 13.

With a configuration as described, by rotating both the microlens disk 7, and the pinhole disk 9, in such a state as mechanically joined together, it becomes possible to scan the surface of the specimen 11 with the excited light 2, so that a scanned image of the observation light 12 scanned by the excited light 2 can be formed on the image sensor 14.

[Patent Document 1]

JP 5-60980 A

[Patent Document 2]

JP 2001-228402 A

SUMMARY OF THE INVENTION

A beam spread-angle of the excited light 2 emitted from the emission end 4b of the optical fiber 4 has an intrinsic design value by the type of the optical fiber 4. The focal length of the collimator lens 6 of the confocal scanner unit 5 joined with the optical fiber 4 has also an intrinsic design value.

Accordingly, unless the beam spread-angle of the optical fiber 4 properly matches with the focal length of the collimator lens 6, it is not possible to effect irradiation of the beams with high efficiency (light quantity distribution is even, and a utilization ratio of the excited light is high). This problem will be described hereinafter with reference to FIGS. 8 to 10.

FIG. 8 is a schematic illustration showing an optical system wherein there is disposed a collimator lens 6 with a long focal length L1, mated to an optical fiber 4 with a small beam spread-angle $\alpha 1$. Reference numeral B denotes beams from the emission end 4b, and B' denotes effective beams transmitting through the collimator lens 6, intentionally abandoning utilization of portions of the beams B, on the peripheral edge thereof.

Reference numeral F1 denotes light quantity distribution on the cross-section of the beams, immediately after the emission end 4b, F2 light quantity distribution before the collimator lens 6, and F3 light quantity distribution of collimated beams after transmitted through the collimator lens 6. The utilization ratio of the excited light is high, and evenness in light quantity distribution, on a practical application level, is secured although the utilization of the portions of the beams B, on the peripheral edge thereof, is abandoned, so that this can be regarded as the case of a well-balanced combination.

FIG. 9 is a schematic illustration showing an optical system wherein an optical fiber 4 with a large beam spread-angle $\alpha 2$ is disposed against the collimator lens 6 with the long focal length L1. With this combination, effective beams B' become narrower in width, in relation to beams B, and portions of the beams B, as abandoned, increases in quantity. Accordingly light quantity distribution F3 of collimated beams after transmitted through the collimator lens 6 is improved in evenness, however, the utilization ratio of the excited light deteriorates, and a finally picked-up image as a whole becomes dark.

FIG. 10 is a schematic illustration showing an optical system wherein there is disposed a collimator lens 6 with a short focal length L2, mated to an optical fiber 4 with a large beam spread-angle $\beta 1$. Reference numeral B denotes beams from the emission end 4b and B' denotes effective beams transmitting through the collimator lens 6, intentionally abandoning utilization of portions of the beams B, on the peripheral edge thereof.

Reference numeral F1 denotes light quantity distribution immediately after the emission end 4b, F2 light quantity distribution before the collimator lens 6, and F3 light quantity distribution of collimated beams after transmitted through the collimator lens 6. The utilization ratio of the excited light is high, and evenness on the practical application level is secured although the utilization of the portions of the beams B, on the peripheral edge thereof, is abandoned, so that this can also be regarded as the case of a well-balanced combination.

FIG. 11 is a schematic illustration showing an optical system wherein an optical fiber 4 with a small beam spread-angle $\beta 2$ is disposed against a collimator lens 6 with a short focal length L2. With this combination, substantially 100% of the beams B are transmitted through the collimator lens 6. Accordingly, the light quantity distribution F3 of the collimated beams after transmitted through the collimator lens 6 deteriorates in evenness although the utilization ratio of the excited light is improved, and the periphery of a finally picked-up image becomes dark.

The present invention has been developed in order to solve the problems described as above, and it is an object of the present invention to provide a confocal scanner capable of being adjusted with ease so as to be in a well-balanced state where a utilization ratio of an excited light is high and light quantity distribution on the cross-section of beams is excellent in evenness even in the case of being coupled with an optical fiber varying in beam spread-angle.

To that end, the invention provides the following:

(1) A confocal scanner provided with a collimator lens for causing beams outgoing from an emission end of an optical fiber for guiding an excited light, with a predetermined spread-angle, to be converted into collimated beams before falling on a microlens disk, wherein a beam spread-angle adjusting means for adjusting the spread-angle is provided between the emission end, and the collimator lens.

(2) A confocal scanner as set forth under item (1) as above, wherein a beam-shaping means for altering intensity distribution of the beams is provided between the collimator lens and the microlens disk.

(3) A confocal scanner as set forth under item (1) as above, wherein a beam-shaping means for altering intensity distribution of the beams is provided between the beam spread-angle adjusting means and the collimator lens.

(4) A confocal scanner as set forth under items (1) or (2) as above, wherein the beam shaping means is implemented by a lens-based means, or a filter means.

As is evident from the description in the foregoing, the present invention has the following advantageous effects.

(1) Since the beam spread-angle adjusting means is provided between the emission end of the optical fiber, and a confocal scanner unit, the excited light with a spread-angle of beams thereof, suited to the collimator lens, can be guided so that it is always possible to maintain a well-balanced state of a utilization ratio of an excited light and light quantity distribution on the cross-section of beams even in the case of using an optical fiber varying in beam spread-angle.

(2) By additionally installing the beam-shaping means between the collimator lens and the microlens disk, or between the beam spread-angle adjusting means and the collimator lens, it becomes possible to make adjustment enabling the light quantity distribution to be more optimized.

BRIEF DESCRIPTION OF THE DRAWINGS

FIG. 10 is a schematic illustration showing an optical system wherein there is disposed a collimator lens with a short focal length, mated to an optical fiber with a large beam spread-angle; and FIG. 11 is a schematic illustration showing an optical system wherein an optical fiber with a small beam spread-angle is disposed against a collimator lens with a short focal length.

PREFERRED EMBODIMENTS OF THE INVENTION

Embodiments of the invention are described in detail hereinafter with reference to the accompanying drawings.

Figure 1:
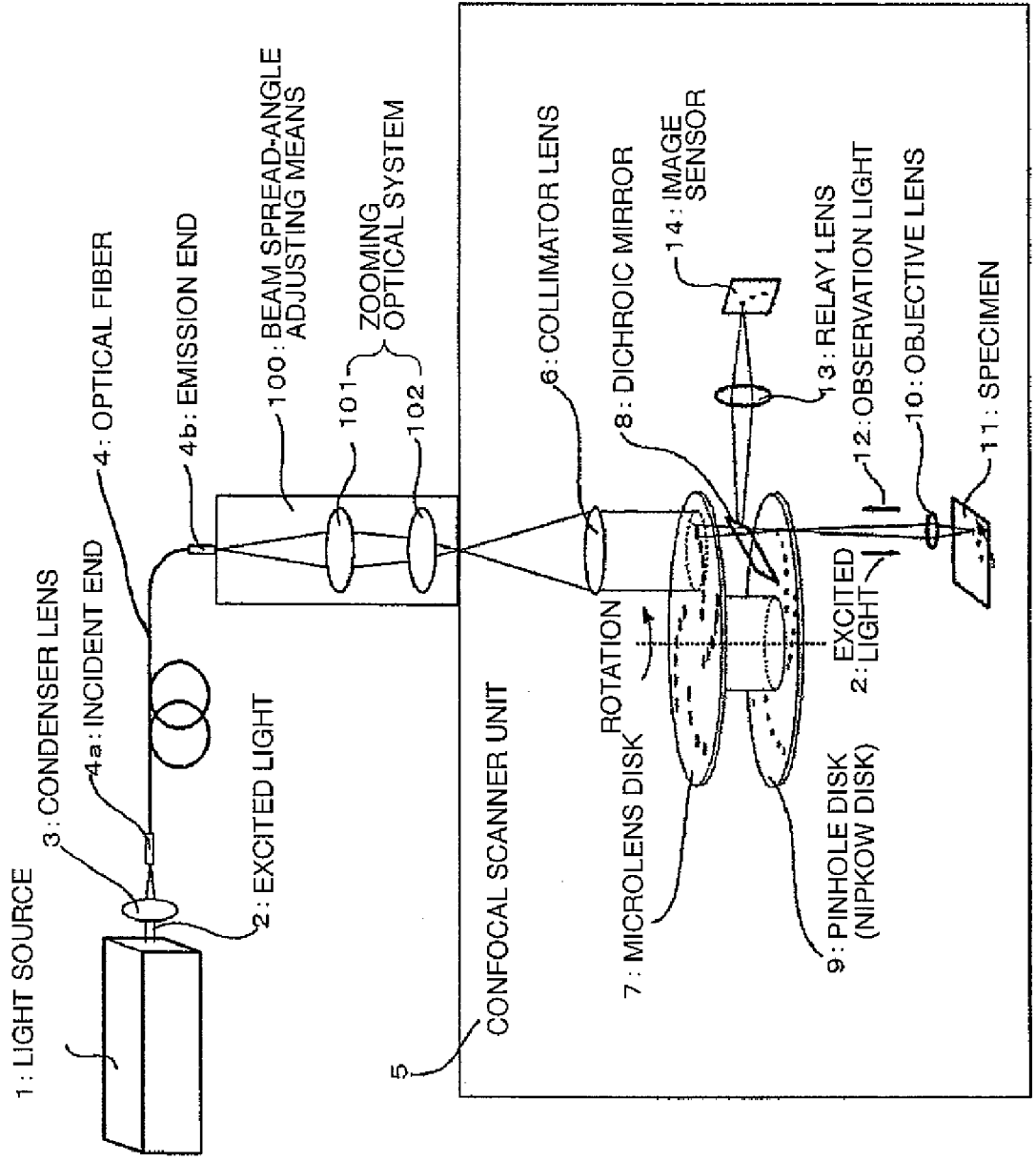
FIG. 1 is a perspective view showing the principal parts of one embodiment of a confocal scanner according to the invention.
Figure 7:
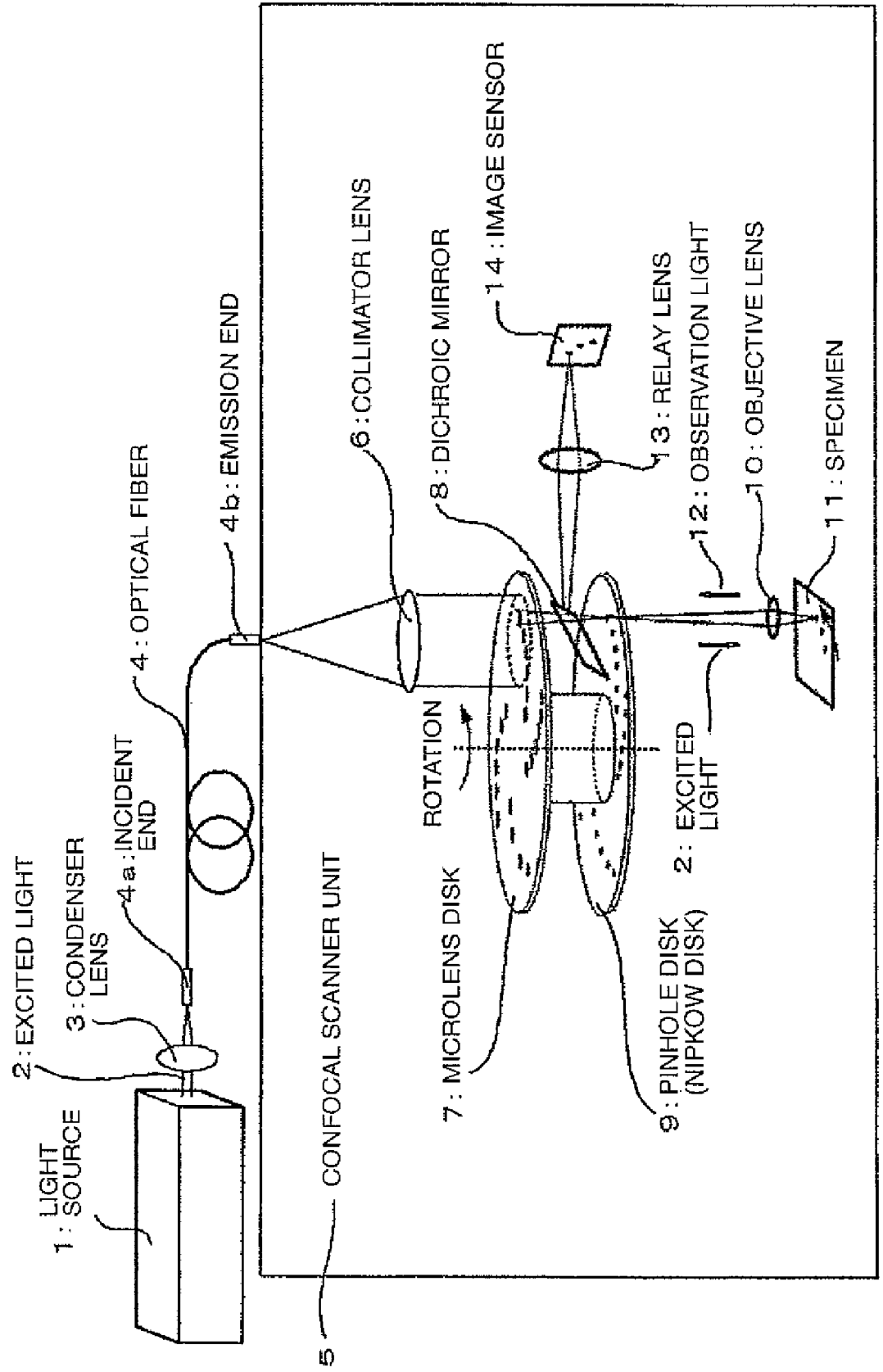
FIG. 7 is a perspective view showing an example of a configuration of the principal parts of a confocal scanner employing the conventional Nipkow disk method.
Figure 8:
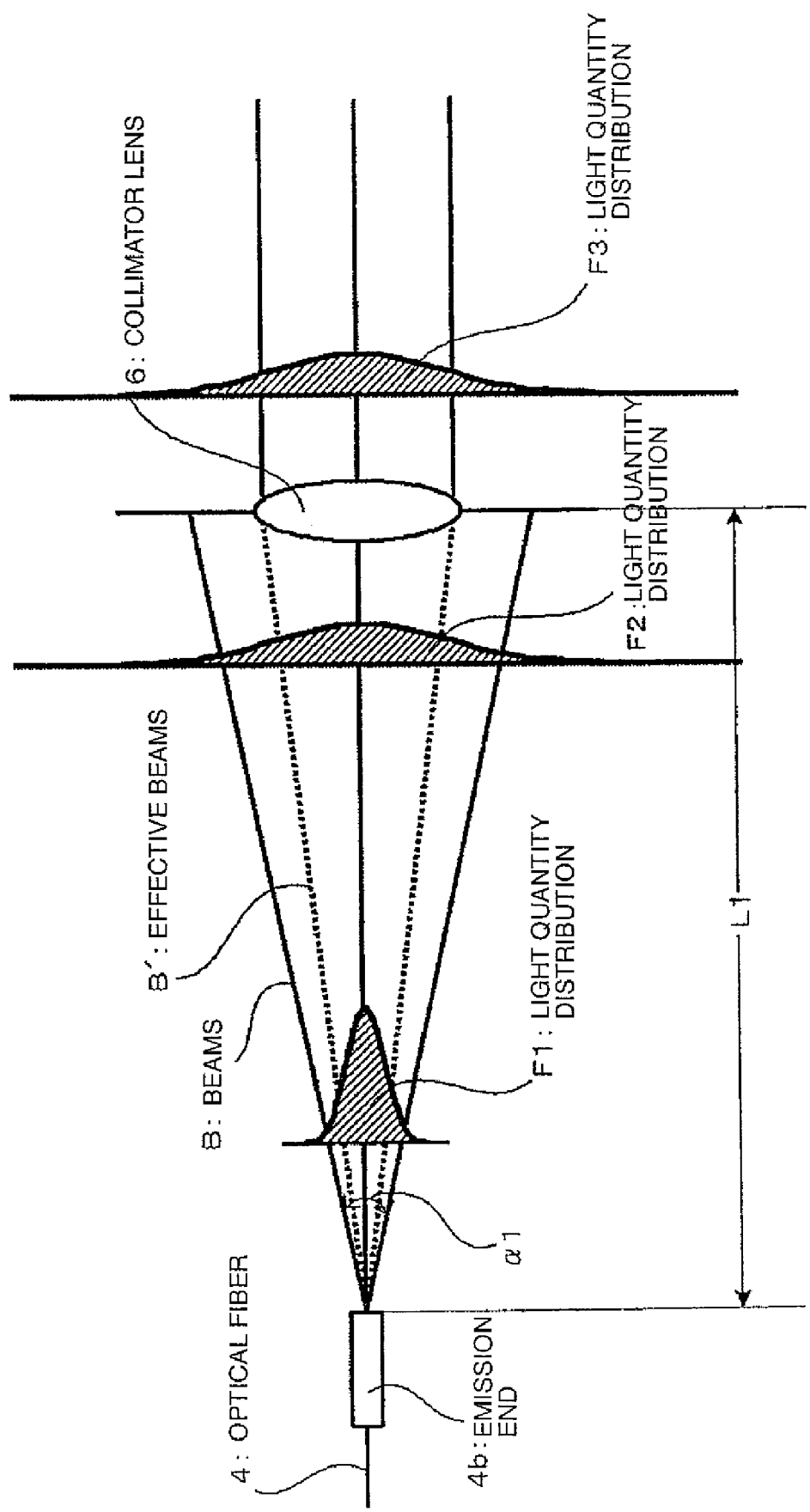
FIG. 8 is a schematic illustration showing an optical system wherein there is disposed a collimator lens with a long focal length, mated to an optical fiber with a small beam spread-angle.
Figure 9:
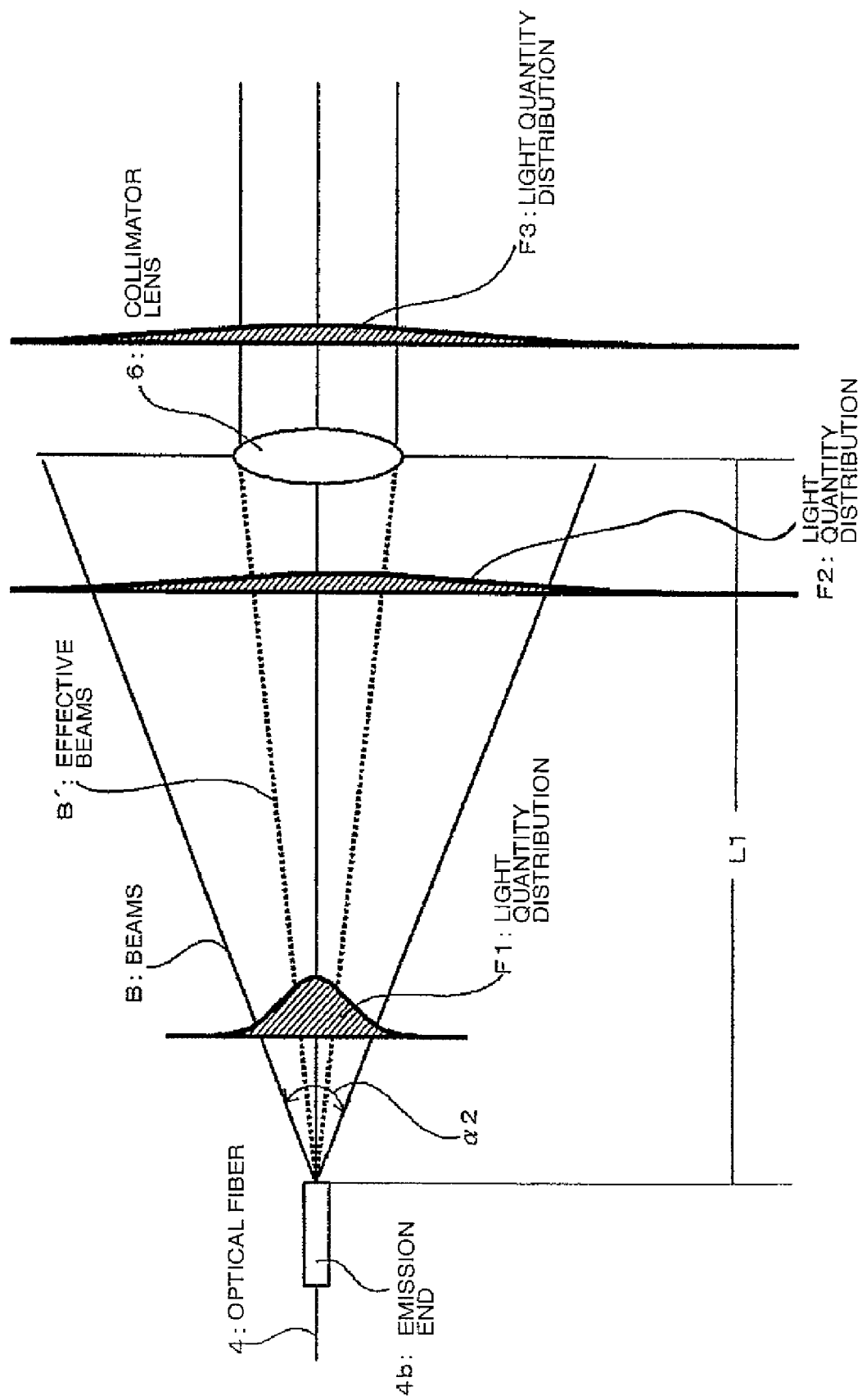
FIG. 9 is a schematic illustration showing an optical system wherein an optical fiber with a large beam spread-angle is disposed against a collimator lens with a long focal length.

FIG. 1 is a perspective view showing the principal parts of one embodiment of a confocal scanner according to the invention. In the figure, constituent elements identical to those in the conventional configuration described with reference to FIG. 7 are denoted by like reference numerals, thereby omitting description thereof. A feature part of the present invention is described hereinafter.

In FIG. 1, reference numeral 100 denotes a beam spread-angle adjusting means constituting the feature part of the present invention, and the beam spread-angle adjusting means 100 is provided in such a form as inserted between an emission end 4b of an optical fiber 4, and a light guide inlet of a confocal scanner unit 5. The beam spread-angle adjusting means 100 comprises lenses 101, 102, making up a type of a zooming optical system.

Figure 2:
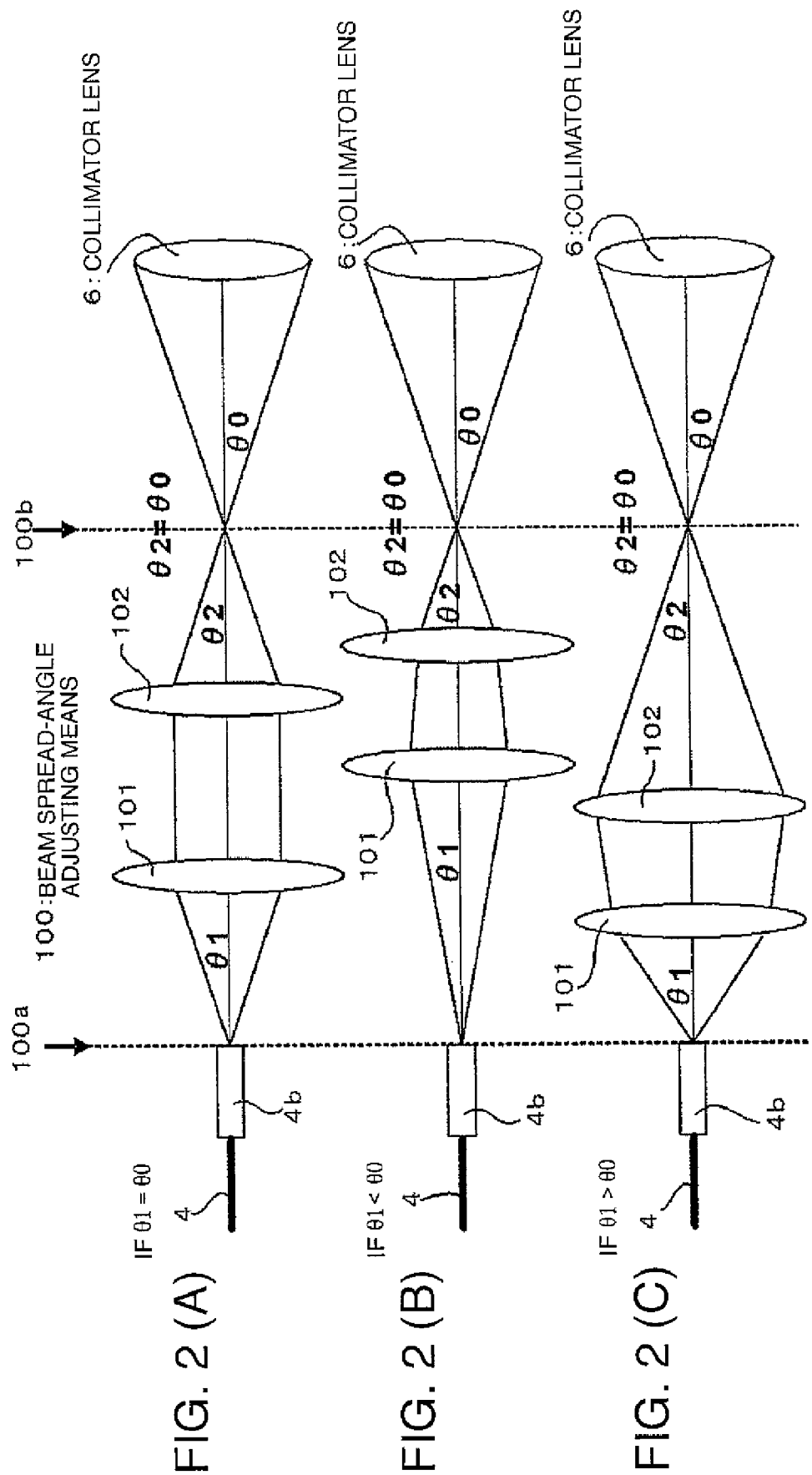
FIGS. 2A to 2C are schematic illustrations of an optical system, each illustrating an operation of a beam spread-angle adjusting means.

FIGS. 2A to 2C are schematic illustrations of an optical system, each illustrating an operation of the beam spread-angle adjusting means 100. With the beam spread-angle adjusting means 100 forming the type of the zooming optical system, it is possible to convert a beam-spread angle $\theta 1$ on an incident side of the optical system into a beam-converging angle $\theta 2$ on an optional emission side of the optical system, in a range where adjustment is enabled by moving the lenses 101, 102, while an optical condensing point 100a on the incident side, and an optical focusing point 100b on the emission side are kept fixed at respective predetermined positions.

Accordingly, by matching the beam-converging angle $\theta 2$ in value with a beam-spread angle $\theta 0$ dependent on the focal distance of a collimator lens 6, and a diameter of the lens, it becomes possible to make adjustment such that the optical fiber 4 varying in beam-spread angle is joined with the confocal scanner unit 5 in an optimum condition.

FIG. 2A shows a case where the beam-spread angle $\theta 1$ on the incident side is equal to the beam-spread angle $\theta 0$ of the collimator lens 6, a correlation therebetween being $\theta 1 = \theta 2 = \theta 0$. FIG. 2B shows a case where the beam-spread angle $\theta 1$ on the incident side is smaller than the beam-spread angle $\theta 0$ of the collimator lens 6, a correlation therebetween being $\theta 1 < \theta 2 = \theta 0$. FIG. 2C shows a case where the beam-spread angle $\theta 1$ on the incident side is greater than the beam-spread angle $\theta 0$ of the collimator lens 6, a correlation therebetween being $\theta 1 > \theta 2 = \theta 0$.

Figure 3:
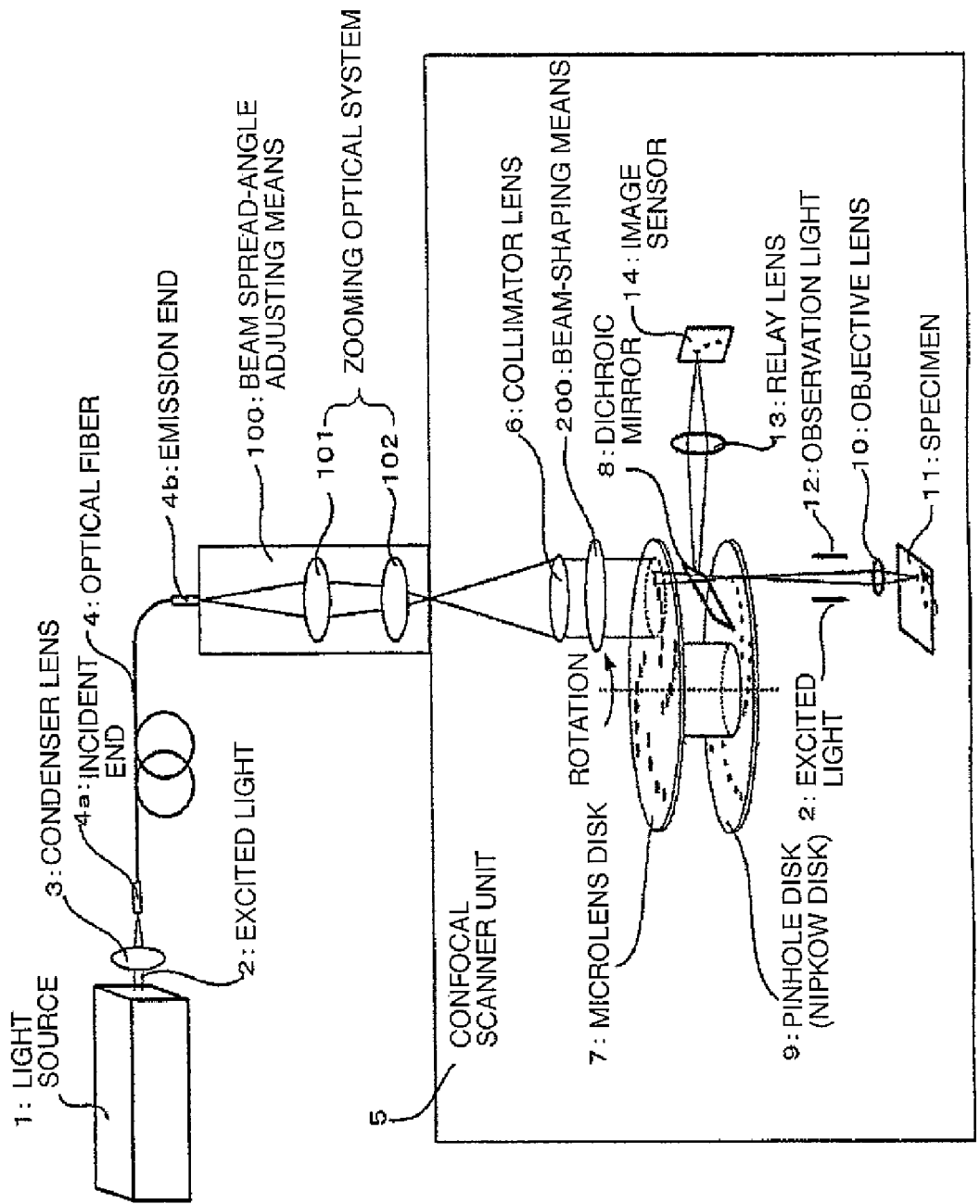
FIG. 3 is a perspective view showing the principal parts of a confocal scanner according to another embodiment of the invention.

FIG. 3 is a perspective view showing the principal parts of a confocal scanner according to another embodiment of the invention. The feature of the present embodiment lies in a configuration wherein a beam-shaping means 200 for altering intensity distribution of beams is provided between the collimator lens 6 and a microlens disk 7. The beam-shaping means 200 is implemented by a lens-based means, or a filter means, and technical details thereof are disclosed in Patent Document 1.

Figure 4:
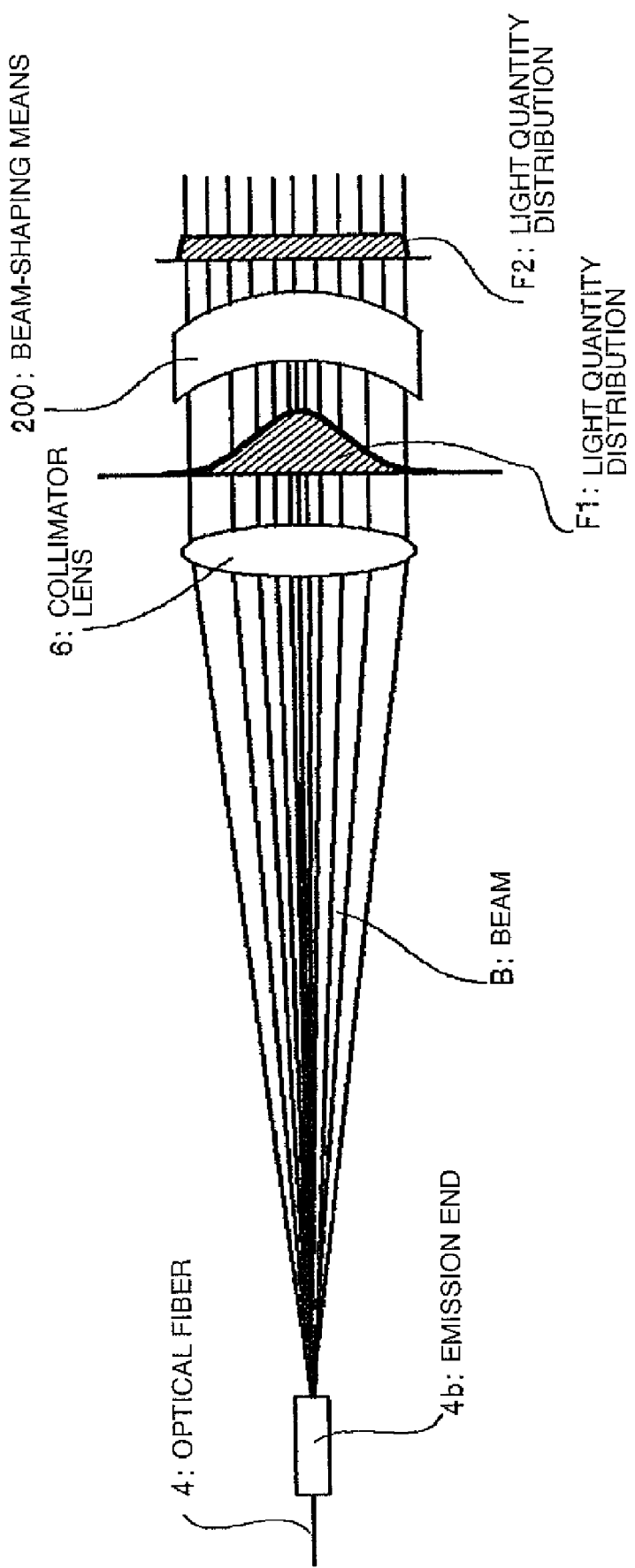
FIG. 4 is an optical schematic illustration, illustrating an operation of a beam-shaping means 200.

FIG. 4 is an optical schematic illustration, illustrating an operation of the beam-shaping means 200. In the figure, the beam spread-angle adjusting means 100 is omitted for brevity. Uneven light quantity distribution F1 after transmitted through the collimator lens 6 is shaped into even light quantity distribution F2 by the beam-shaping means 200.

Figure 5:
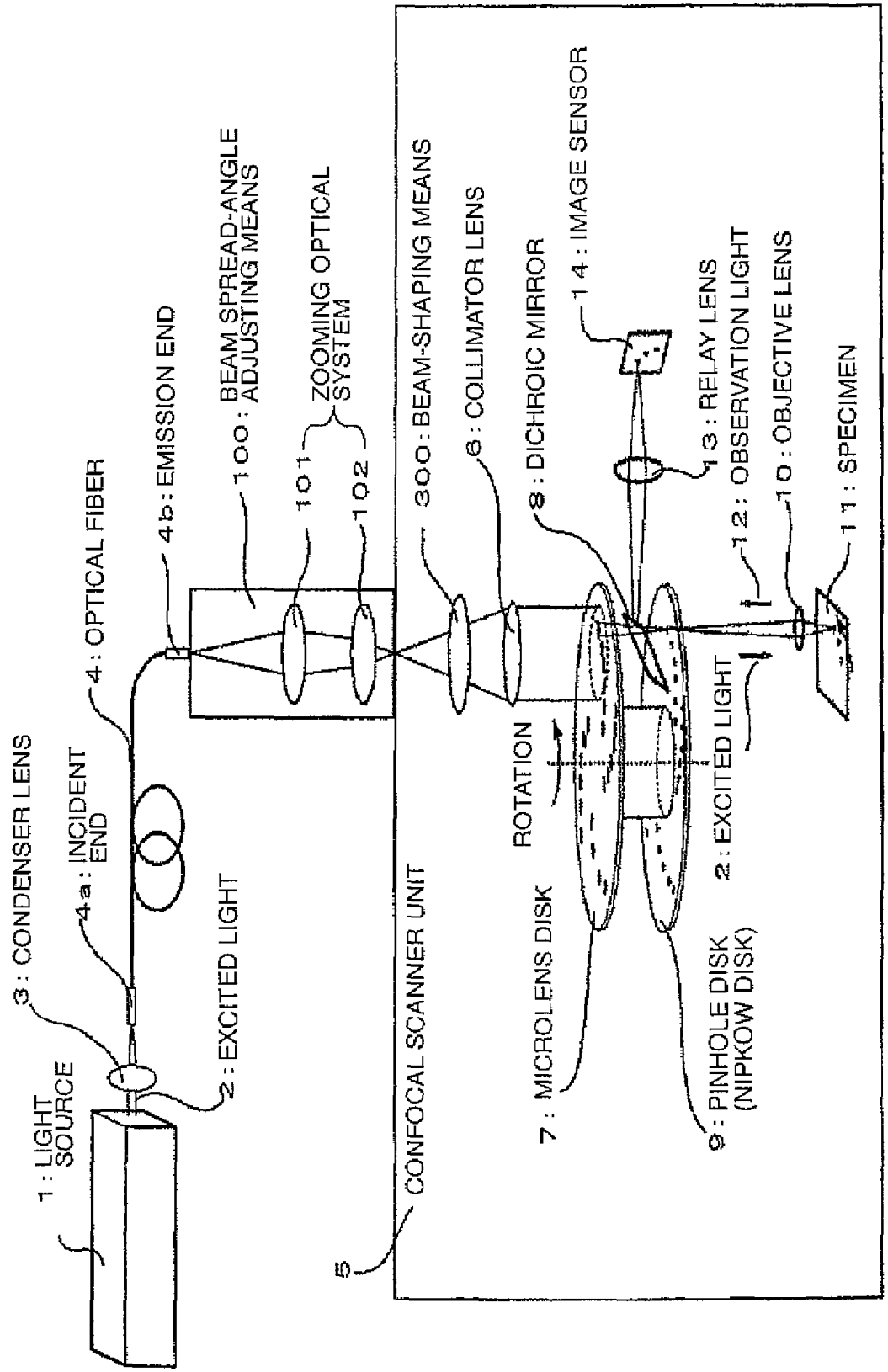
FIG. 5 is a perspective view showing the principal parts of a confocal scanner according to still another embodiment of the invention.

FIG. 5 is a perspective view showing the principal parts of a confocal scanner according to still another embodiment of the invention. The feature of the present embodiment lies in a configuration wherein a beam-shaping means 300 for altering intensity distribution of beams is provided between a beam spread-angle adjusting means and a collimator lens 6.

Figure 6:
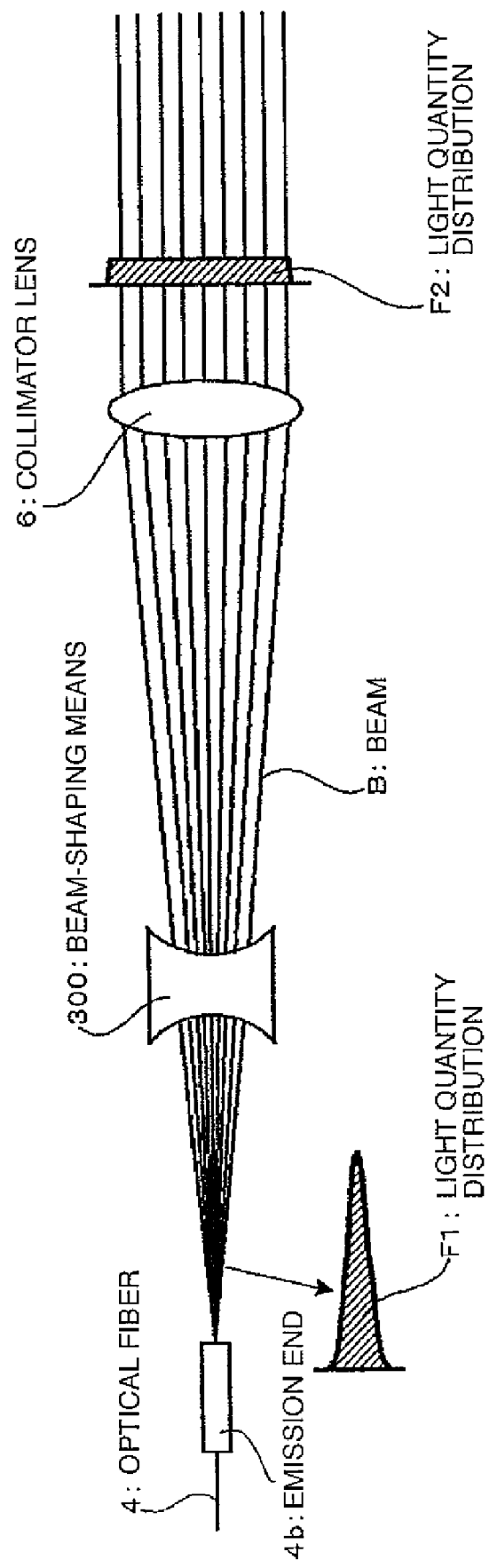
FIG. 6 is an optical schematic illustration, illustrating an operation of a beam-shaping means 300.

FIG. 6 is an optical schematic illustration, illustrating an operation of the beam-shaping means 300. In the figure, the beam spread-angle adjusting means 100 is omitted for brevity. Uneven light quantity distribution F1 at an emission end 4b is shaped by the beam-shaping means 300, so that light quantity distribution F2 after transmitted through the collimator lens 6 is converted into even light quantity distribution.

In general, in the case where light quantity distribution of beams incident on the beam-shaping means 200, or 300 is not suited to the beam-shaping means, there is a possibility that evenness in light quantity distribution on the cross-section of the beams will undergo deterioration contrary to expectation. In order to avoid such eventuality, light intensity distribution of incident light to the beam-shaping means, on the cross-section of the beams, need always be suited to the beam-shaping means. However, this condition can be easily satisfied by adjusting a spread-angle of incident beams to a predetermined value as desired.

The beam-shaping means 200, or 300 can be used for the purpose of rendering light quantity distribution intentionally uneven by, for example, brightening specified spots of a specimen while darkening the rest besides the purpose of evening out light quantity distribution of beams falling from the collimator lens 6 on the microlens disk 7.

With those embodiments shown in FIGS. 4 and 6, respectively, optical components such as a mirror for bending an optical path, a filter for selecting wave-lengths, an ND filter for attenuating intensity, and so forth are omitted for brevity in description, however, it is to be pointed out that the same advantageous effects are obtained even if those are included.

What is claimed is:

1. A confocal scanner, comprising:
a microlens disk;
an optical fiber for guiding excitation light, wherein a beam of excitation light outgoing from an emission end of the optical fiber has a beam spread angle that is predetermined based on a type of optical fiber;
a beam spread angle adjusting means for receiving the beam outgoing from the emission end of the optical fiber and adjusting the beam spread angle of the received beam;
a collimator lens for receiving a beam having the adjusted beam spread angle from the beam spread angle adjusting means and converting the received beam having the adjusted spread angle into the collimated beam before falling on the microlens disk,
wherein the beam spread angle adjusting means is adapted to receive beams emitted from different types of optical fibers that respectively emit beams having different beam spread angles, and the beam spread angle adjusting means adjusts the beam spread angle of respective beams emitted from the different types of optical fibers such that the different beam spread angles are each converted to the same beam spread angle at an optical focusing point on an emission side of the beam spread angle adjusting means and are incident to the collimator lens, and
wherein the beam spread angle adjusting means operates such that an optical focusing point on an incident side of the beam spread angle adjusting means and an optical focusing point on an emission side of the beam spread angle adjusting means are fixed at respective predetermined positions, the predetermined positions being the same for each of the different types of optical fibers.

2. A confocal scanner according to claim 1, further comprising:
a beam-shaping means for altering intensity distribution of the beams provided between the collimator lens and the microlens disk.

3. A confocal scanner according to claim 1, further comprising:
a beam-shaping means for altering intensity distribution of the beams provided between the beam spread-angle adjusting means and the collimator lens.

4. A confocal scanner according to claim 2, wherein the beam-shaping means comprises a lens-based means, or a filter means.

\* \* \* \* \*